(12) United States Patent
Paek et al.

(10) Patent No.: US 7,898,637 B2
(45) Date of Patent: Mar. 1, 2011

(54) LIQUID CRYSTAL DISPLAY DEVICE AND METHOD OF MANUFACTURING THE SAME

(75) Inventors: Seung Han Paek, Incheon (KR); Kyoung-Mook Lee, Seoul (KR); Yong In Park, Annyang-si (KR); Choon Ho Park, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 129 days.

(21) Appl. No.: 12/332,810

(22) Filed: Dec. 11, 2008

(65) Prior Publication Data

US 2009/0323009 A1  Dec. 31, 2009

(30) Foreign Application Priority Data

Jun. 27, 2008  (KR) .................. 10-2008-0061578

(51) Int. Cl.
*G02F 1/1333* (2006.01)
*G02F 1/13* (2006.01)
*G02F 1/1335* (2006.01)

(52) U.S. Cl. ........... 349/158; 349/106; 349/187; 257/40; 257/433

(58) Field of Classification Search .................. 349/106, 349/158, 187; 345/66; 257/40, 433
See application file for complete search history.

(56) References Cited

U.S. PATENT DOCUMENTS

| 6,956,638 B2 * | 10/2005 | Akiyama et al. .............. 349/187 |
| 2002/0195676 A1 * | 12/2002 | Hamamoto et al. ........... 257/433 |
| 2007/0045621 A1 * | 3/2007 | Suzuki et al. .................... 257/40 |

* cited by examiner

*Primary Examiner* — Julie-Huyen L Ngo
(74) *Attorney, Agent, or Firm* — Brinks Hofer Gilson & Lione (57) ABSTRACT

A method of manufacturing a liquid crystal display device includes attaching a flexible substrate and a base substrate using an adhesive therebetween, the base substrate including substantially pure iron; forming a plurality of thin films on a surface of the flexible substrate attached to the base substrate, the surface of the flexible substrate opposite to the attached surface of the flexible substrate; and etching the base substrate after forming the plurality of thin films.

9 Claims, 7 Drawing Sheets

LIQUID CRYSTAL DISPLAY DEVICE AND METHOD OF MANUFACTURING THE SAME

RELATED APPLICATIONS

The present invention claims the benefit of Korean Patent Application No. 2008-0061578, filed in Korea on Jun. 27, 2008, which is hereby incorporated by reference for all purposes as if fully set forth herein.

BACKGROUND

1. Field of the Invention

The present invention relates to a liquid crystal display device, and more particularly, a flexible liquid crystal display device and a method of manufacturing the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

Figure 1:
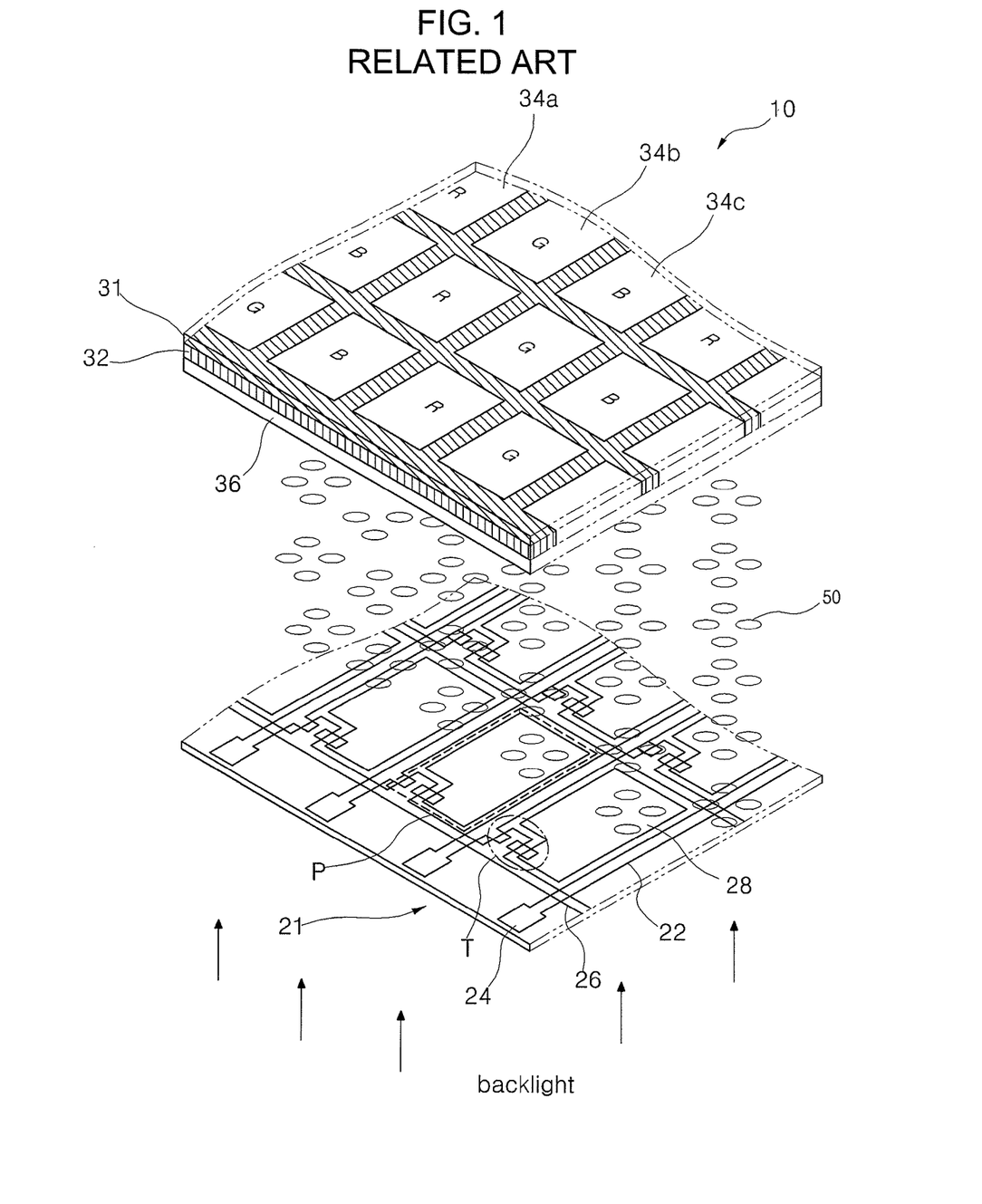
FIG. 1 is a perspective view illustrating an LCD device.

FIG. 1 is a perspective view illustrating an LCD device.

Referring to FIG. 1, the LCD device 10 includes a liquid crystal panel including an array substrate, a color filter substrate and a liquid crystal layer 50 between the array substrate and the color filter substrate, and a backlight unit supplying a backlight to the liquid crystal panel.

The array substrate includes gate and data lines 26 and 22 crossing each other on a first substrate 21 to define a pixel region P. In the pixel region P, a thin film transistor T is connected to the gate and data lines 26 and 22, and a pixel electrode 28 is connected to the thin film transistor T.

The color filter substrate includes a black matrix 32 on a second substrate 31, and red (R), green (G) and blue (B) color filter patterns 34a, 34b and 34c in the respective pixel regions P. A common electrode 36 is on the black matrix 32 and the color filter patterns 34a to 34c.

The gate lines 26 are sequentially selected and supplied with an on gate voltage, the thin film transistor T is thus turned on, and a data voltage is supplied to the pixel electrode 28. Accordingly, an electric field is induced between the pixel electrode 28 and the common electrode 36, and alignment of the liquid crystal molecules of the liquid crystal layer 50 changes in accordance with the intensity of the induced electric field.

The first and second substrates 21 and 31 are made of glass. Recently, portable terminals such as PDA (personal digital assistant) have been widely used, and a flexible LCD device using flexible substrates is thus proposed since the flexible substrate has advantages such as low weight and flexibility.

However, it is difficult to apply the flexible substrates to conventional apparatuses for quartz or glass substrates. For example, the flexible substrates are not transferred by a track device or robot, or not placed in a cassette.

To resolve these problems, proposed is a method that, in a state that the flexible substrate is attached to a base substrate of quartz or glass, manufacturing processes are performed for the flexible substrate, and then, at a predetermined time, the flexible substrate is detached from the base substrate. However, this method increases the production cost since the cost of glass and quartz increases. Further, it is difficult to detach the flexible substrate from the base substrate since a temporary adhesive is attached to an entire surface of the base substrate, and some of the temporary adhesive may remain on the flexible substrate even after detaching the flexible substrate from the base substrate. Accordingly, an additional cleaning process is required to remove the residual temporary adhesive on the flexible substrate.

Further, the temporary adhesive should have an appropriate adhesive strength capable of preventing the flexible substrate from being detached from the base substrate in the manufacturing processes, and of easily detaching the flexible substrate from the base substrate after the manufacturing processes. However, it is difficult to select the temporary adhesive having such the appropriate property. Further, the cost of the temporary adhesive is high, and production cost of the LCD device thus increases.

BRIEF SUMMARY

A method of manufacturing a liquid crystal display device includes attaching a flexible substrate and a base substrate using an adhesive therebetween, the base substrate including substantially pure iron; forming a plurality of thin films on a surface of the flexible substrate attached to the base substrate, the surface of the flexible substrate opposite to the attached surface of the flexible substrate; and etching the base substrate after forming the plurality of thin films.

In another aspect, a liquid crystal display device includes a first substrate including a first flexible substrate and a thin film transistor on an inner surface of the first flexible substrate; a second substrate including a second flexible substrate; a liquid crystal layer between the first and second substrates; and first and second adhesive buffer layers on outer surfaces of the first and second flexible substrates, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to illustrated embodiments of the present invention, which are illustrated in the accompanying drawings.

Figure 2:
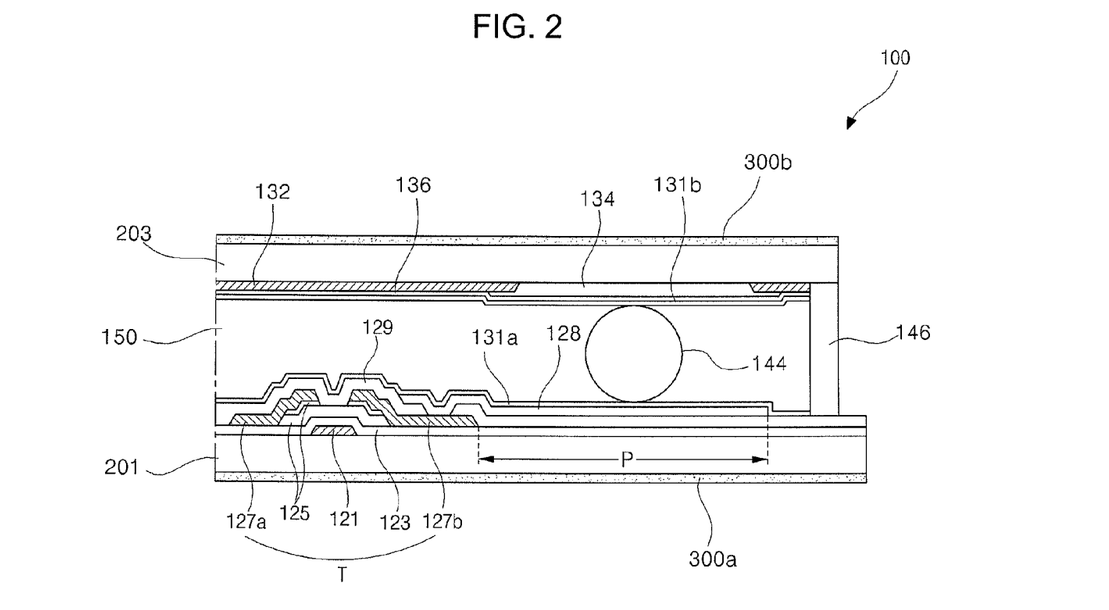
FIG. 2 is a cross-sectional view illustrating an LCD device according to an embodiment of the present invention.

FIG. 2 is a cross-sectional view illustrating an LCD device according to an embodiment of the present invention.

Referring to FIG. 2, the LCD device 100 includes a liquid crystal panel including a first substrate referred to as an array substrate, a second substrate referred to as a color filter substrate, and a liquid crystal layer 150 between the first substrates and the second substrate. A backlight unit supplies light to the liquid crystal panel.

The first substrate includes a first flexible substrate 201, and gate and data lines crossing each other on an inner surface of the first flexible substrate 201 to define a pixel region P. In the pixel region P, a thin film transistor T is connected to the corresponding gate and data lines, and a pixel electrode 128 is connected to the thin film transistor T.

The thin film transistor T includes a gate electrode 121, a semiconductor layer 125, and source and drain electrodes 127a and 127b. A gate insulating layer 123 is on the gate electrode 121 and the gate line. A passivation layer 129 is on the thin film transistor T and has a drain contact hole exposing the drain electrode 127b. The pixel electrode 128 is connected to the drain electrode 127b through the drain contact hole.

The second substrate includes a second flexible substrate 203, and a black matrix 132 on an inner surface of the second flexible substrate 203. The black matrix 132 may correspond to the gate and data lines and the thin film transistor T. A color filter layer 134 corresponds to the pixel region P. A common electrode 136 is on the black matrix 132 and the color filter layer 134.

The first substrate and the second substrate include first and second alignment layers 131a and 131b at inner surfaces of the first and second substrates, respectively. The first and second alignment layers 131a and 131b are rubbed to align liquid crystal molecules of the liquid crystal layer 150.

A spacer 144 is disposed between the first substrate and the second substrate to maintain a cell gap between the first and second substrates. A seal pattern 146 is disposed in peripheral regions of the first and second substrates and attaches the first and second substrates.

At least one of the first and second flexible substrates 201 and 203 may be made of a flexible transparent material or a flexible opaque material. The flexible transparent material may include a plastic. The flexible opaque material may include a metal material such as a metal foil of stainless steel. For example, when the backlight unit is used and the LCD device 100 is a transmissive type or a transflective type, the first and second flexible substrates 201 and 203 may be made of a transparent material. When the backlight unit is not used and the LCD device is a reflective type, the first flexible substrate 201 may be made of an opaque material and the second flexible substrate 203 may be made of a transparent material.

First and second adhesive buffer layers 300a and 300b may be on outer surfaces of the first and second flexible substrates 201 and 203, respectively. The first and second adhesive buffer layers 300a and 300b function to attach the first and second flexible substrates 201 and 203 to corresponding base substrates while manufacturing the first and second substrates. The first and second adhesive buffer layers 300a and 300b may function as a permanent adhesive.

First and second polarizes may be on the outer surfaces of the first and second adhesive buffer layers 300a and 300b, respectively.

Figure 3:
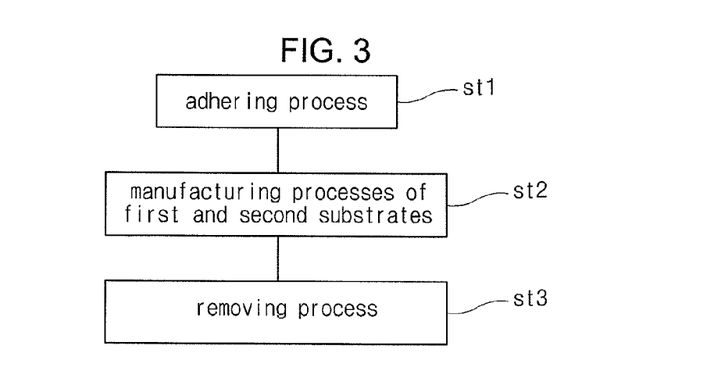
FIG. 3 is a flow chart illustrating manufacturing the LCD device according to the embodiment of the present invention.
Figure 4:
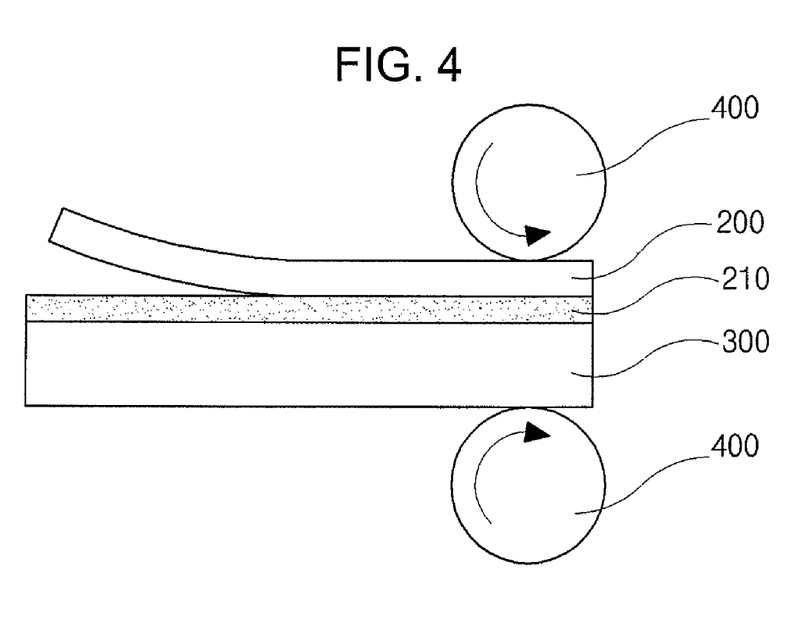
FIG. 4 is a view illustrating a lamination process of attaching a flexible substrate to a base substrate according to the embodiment of the present invention.
Figure 5A:
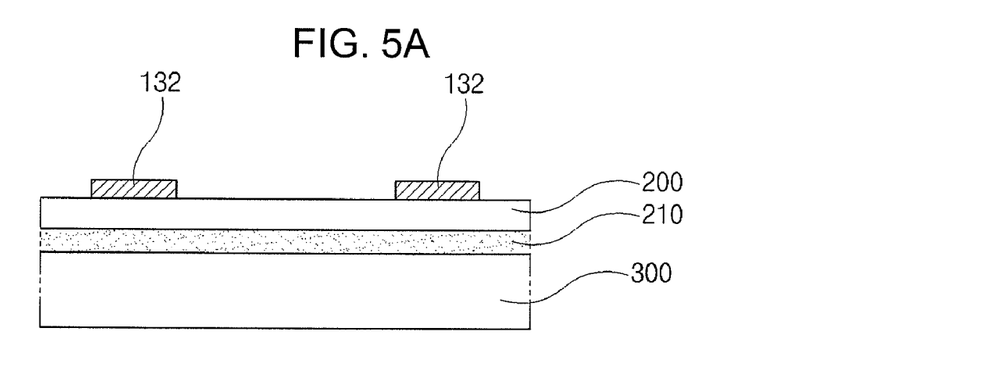
FIGS. 5A and 5C are cross-sectional views illustrating manufacturing the second substrate of the LCD device according to the embodiment of the present invention.
Figure 5B:
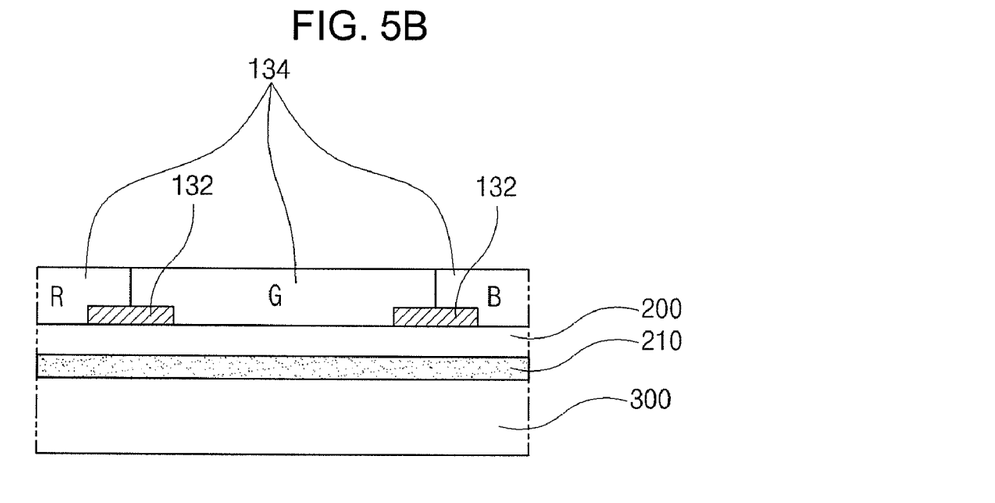
Figure 5C:
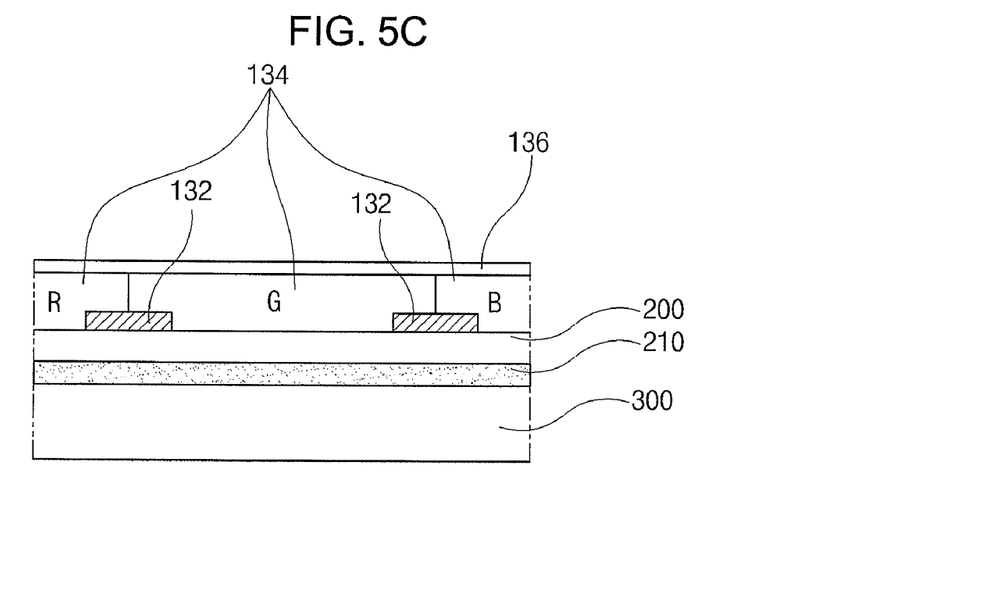
Figure 6A:
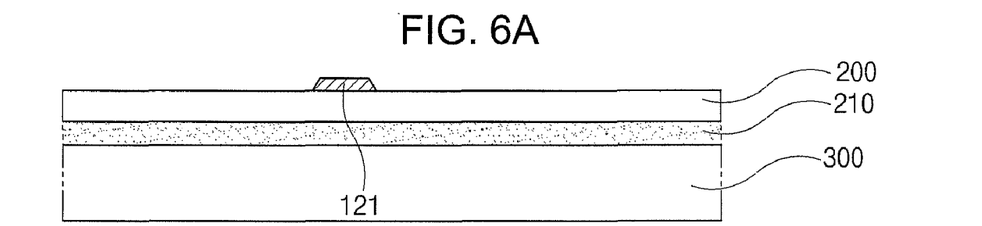
FIGS. 6A and 6E are cross-sectional views illustrating manufacturing the first substrate of the LCD device according to the embodiment of the present invention.
Figure 6B:
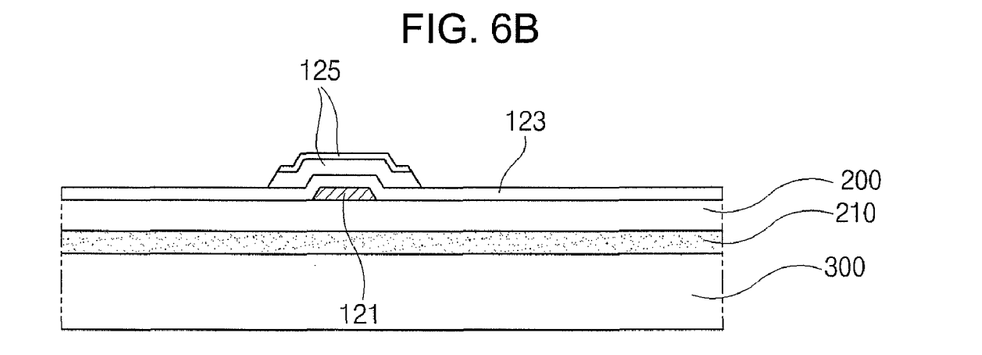
Figure 6C:
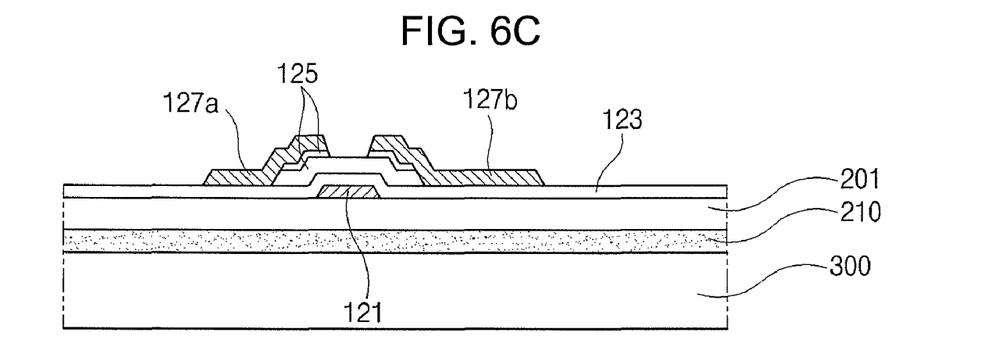
Figure 6D:
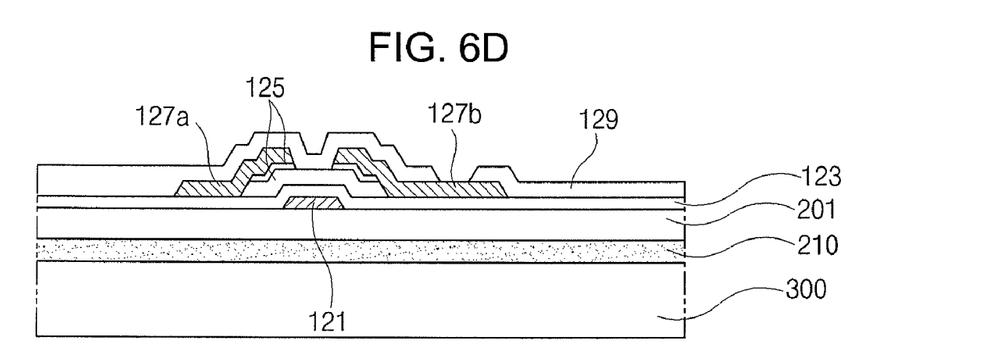
Figure 6E:
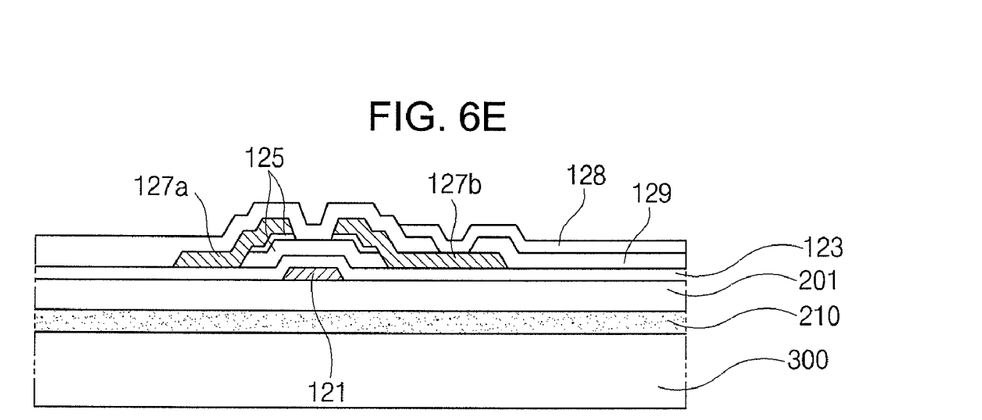
Figure 7A:
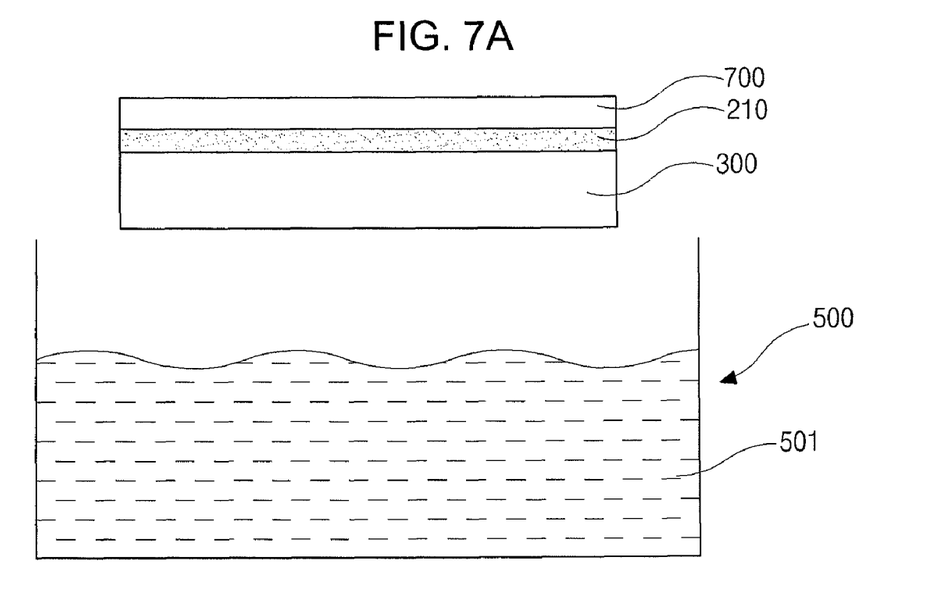
FIGS. 7A and 7B are views illustrating removing the base substrate attached to the first or second substrate according to embodiment of the present invention.
Figure 7B:
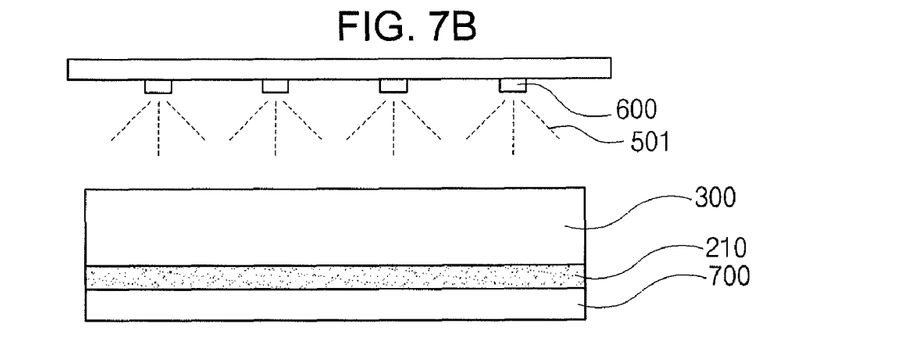

FIG. 3 is a flow chart illustrating manufacturing the LCD device according to the embodiment of the present invention, FIG. 4 is a view illustrating a lamination process of attaching a flexible substrate to a base substrate according to the embodiment of the present invention, FIGS. 5A and 5C are cross-sectional views illustrating manufacturing the second substrate of the LCD device according to the embodiment of the present invention, FIGS. 6A and 6E are cross-sectional views illustrating manufacturing the first substrate of the LCD device according to the embodiment of the present invention, and FIGS. 7A and 7B are views illustrating removing the base substrate attached to the first or second substrate according to embodiment of the present invention.

Referring to FIG. 3, the flexible LCD device (100 of FIG. 2) is manufactured in an adhering process st1, manufacturing processes of first and second substrates st2, and a removing process st3.

Referring to FIG. 4, in the adhering process st1, a flexible substrate 200 is attached to a base substrate 300 with an adhesive buffer layer 210 therebetween in a lamination process. The flexible substrate 200 may be the first or second substrate (201 or 203 of FIG. 2).

In the lamination process, an adhesive buffer material may be coated on one of the flexible substrate 200 and the base substrate 300. Then, at about 50 degrees temperature in celcius (° C.), a laminator 400 rolls and applies pressure to the flexible substrate 200 and the base substrate 300, and the flexible substrate 200 and the base substrate 300 are attached.

The base substrate 300 may be made of a metal material which has much amount of substantially pure iron, and the base substrate 300 may have a property, for example, a bent property and a heat-resisting property similar to that of a glass or quartz substrate. As the base substrate 300 has more amount of pure iron, cost is lower. Accordingly, the cost of the base substrate 300 can be reduced compared to the base substrate made of quartz or glass in the related art.

The lamination process should be conducted such that bubbles do not occur between the flexible substrate 200 and the adhesive buffer layer 210 and between the base substrate 300 and the adhesive buffer layer 210. The bubbles may cause the reliability of the method of manufacturing the LCD device to be reduced. Accordingly, the lamination process may be conducted in a vacuum condition to prevent bubbles from occurring between the flexible substrate 200 and the adhesive buffer layer 210 and between the base substrate 300 and the adhesive buffer layer 210.

The adhesive buffer material may be coated using a spin coating method or a lamination method. The adhesive buffer layer 210 may have a property that the high adhesive strength is not reduced even in increase or decrease of temperature and the adhesive buffer layer 210 is hardened after a predetermined time. The adhesive buffer layer 210 may be made of a silicon group adhesive such as a silicon PSA (pressure sensitive adhesive), a high heat-resisting silicon adhesive and the like. Since the adhesive buffer layer 210 has cost lower than that of the temporary adhesive in the related art, production cost can be reduced.

In a state that the flexible substrate 200 attached to the base substrate 300 through the adhesive buffer layer 210, the manufacturing processes of the LCD device are performed. For example, the flexible substrates 200 attached to the base substrate 300 can be transferred by a track device or robot, be placed in a cassette, and be applied to various manufacturing processes such as a thin film deposition, a photolithography, an etching and the like.

After the flexible substrate 200 is attached to the base substrate 300, the first and second substrates can be manufactured using the flexible substrate 200.

Referring to FIG. 5A, a black matrix 132 is formed using a photolithography on a surface of the flexible substrate 200 attached to the base substrate 300 using the adhesive buffer layer 210. The flexible substrate 200 is the second flexible substrate (203 of FIG. 2). The flexible substrate 200 may be transparent.

Then, referring to FIG. 5B, a color filter layer 134 is formed on the flexible substrate 200 having the black matrix 132. For example, red (R), green (G) and blue (B) color filter materials are sequentially deposited and patterned using a photolithography to form the red, green and blue color filter patterns in the respective pixel regions.

Then, referring to FIG. 5C, a common electrode 136 is formed on the flexible substrate 200 having the color filter layer 134. Through the aforementioned processes, the second substrate is manufactured.

Referring to FIG. 6A, a metallic material is deposited and patterned using a photolithography to form a gate electrode 121 on a surface of the flexible substrate 200 attached to the base substrate 300 using the adhesive buffer layer 210. The metallic material may be at least one of aluminum (Al), copper (Cu), tungsten (W), chromium (Cr), and molybdenum (Mo). The flexible substrate 200 is the first flexible substrate (201 of FIG. 2).

Then, referring to FIG. 6B, a gate insulating layer 123 is formed on the flexible substrate 200 having the gate electrode 121. The gate insulating layer 123 may be made of an inorganic insulating material such as silicon nitride (SiNx) and silicon oxide (SiO$_2$). Then, an intrinsic amorphous silicon and an impurity-doped amorphous silicon are deposited on the gate insulating layer 123 and patterned using a photolithography to form a semiconductor layer 125.

Then, referring to FIG. 6C, a metallic material is deposited on the flexible substrate 200 having the semiconductor layer 125 and patterned using a photolithography to form source and drain electrodes 127a and 127b spaced apart from each other. The metallic material may be at least one of aluminum (Al), copper (Cu), tungsten (W), chromium (Cr), and molybdenum (Mo).

Then, referring to FIG. 6D, a passivation layer 129 is formed on the flexible substrate 200 having the source and drain electrodes 127a and 127b and patterned using a photolithography to form a drain contact hole exposing the drain electrode 127b. The passivation layer 129 may be made of an inorganic insulating material such as silicon nitride (SiNx) and silicon oxide (SiO$_2$), or an organic insulating material such as benzocyclobutene (BCB) and acrylic resin.

Then, referring to FIG. 6E, a transparent conductive material is deposited on the passivation layer 129 and patterned using a photolithography to form a pixel electrode 128 contacting the drain electrode 127b through the drain contact hole. The transparent conductive material may be at least one of indium-tin-oxide (ITO), indium-zinc-oxide (IZO) and indium-tin-zinc-oxide (ITZO). Through the aforementioned processes, the first substrate is manufactured.

After the first and second substrates each are manufactured in the second step st2, the removing process is conducted in the third step st3. For example, the removing process is conducted by etching the base substrate 300.

Referring to FIG. 7A, the base substrate 300 attached to the substrate 700, which is the first substrate manufactured in the processes of FIGS. 5A to 5C or the second substrate manufactured in the processes of FIGS. 6A to 6E, is dipped in an etchant 501 of an etchant tank 500. The etchant 501 may include a halogen material such as chloride (Cl), bromine (Br) and iodine (I). For example, the etchant 501 may include at least one of chloride (Cl), bromine (Br) and iodine (I).

Alternatively, referring to FIG. 7B, the etchant 501 is sprayed through a spraying nozzle 600 on the base substrate 300.

In the etching process, the adhesive buffer layer 210 may function as a buffer protecting the substrate 700 from being etched. Accordingly, the substrate 700 is not damaged by the adhesive buffer layer 210.

After the base substrate 210 is removed, the adhesive buffer layer 210 may not be removed and remain on the flexible substrate of the substrate 700. The remaining adhesive buffer layer 210 may function as a protection layer insulating the flexible substrate and preventing oxidization of the flexible substrate. Further, when the flexible substrate is made of a metal material such as a metal foil, the adhesive buffer layer 210 may prevent corrosion of the flexible substrate. Further, when the flexible substrate is made of a plastic material, the adhesive buffer layer 210 may prevent moisture from permeating into the flexible substrate.

After the base substrate 300 is removed, the seal pattern (146 of FIG. 2) is formed in the peripheral region of one of the first and second substrates, and the first and second substrates are attached using the seal pattern to manufacture the liquid crystal panel. Then, polarizers and driving circuits are attached to the liquid crystal panel, and then, processes of assembling the liquid crystal panel and a backlight unit are conducted using components such as a main supporter, a bottom case, a top case and the like. Accordingly, the LCD device is manufactured.

As described in the embodiment, the flexible LCD device is manufactured using the base substrate cheaper than the base substrate of quartz or glass in the related art, and the adhesive buffer layer cheaper than the temporary adhesive in the related art. Accordingly, production cost can be reduced.

Further, the base substrate can be easily removed by the etching process, and the additional process such as the cleaning process to remove the residual temporary adhesive in the related art is not required. Accordingly, production efficiency can improve.

In the embodiment, the flexible LCD device is mainly explained. However, the embodiment may be applied to various flexible flat displays using the flexible substrate, such as an organic electroluminescence display (OELD) device, electrophoresis display device and the like.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of manufacturing a liquid crystal display device, comprising:
   attaching a flexible substrate and a base substrate using an adhesive therebetween, the base substrate including substantially pure iron;
   forming a plurality of thin films on a surface of the flexible substrate attached to the base substrate, the surface of the flexible substrate opposite to the attached surface of the flexible substrate; and
   etching the base substrate after forming the plurality of thin films.

2. The method according to claim 1, wherein etching the base substrate includes dipping the base substrate into an etchant.

3. The method according to claim 1, wherein etching the base substrate includes spraying an etchant on the base substrate.

4. The method according to claim 2, wherein the etchant includes a halogen material.

5. The method according to claim 1, wherein attaching the flexible substrate and the base substrate includes coating the adhesive on one of the flexible substrate and the base substrate.

6. The method according to claim 1, wherein the plurality of thin films includes a gate electrode, a semiconductor layer and source and drain electrodes forming a thin film transistor.

7. The method according to claim 1, wherein the plurality of thin films includes a black matrix and a color filter layer.

8. The method according to claim 1, wherein the adhesive is one of a silicon pressure sensitive adhesive and a high heat-resisting silicon adhesive.

9. The method according to claim 1, wherein the adhesive is hardened after a predetermined time.

* * * * *